United States Patent [19]
Seitzer

[11] 3,859,373
[45] Jan. 7, 1975

[54] MANUFACTURE OF HYDROGEN
[75] Inventor: Walter H. Seitzer, West Chester, Pa.
[73] Assignee: Sun Ventures, Inc., St. Davids, Pa.
[22] Filed: Mar. 7, 1974
[21] Appl. No.: 448,847

[52] U.S. Cl. .............................. 423/657, 423/648
[51] Int. Cl. ..... C01g 41/00, C01b 1/02, C01b 1/03
[58] Field of Search .................... 423/657, 648, 606

[56] References Cited
UNITED STATES PATENTS
1,023,290   4/1912   Arsen.............................. 423/606

OTHER PUBLICATIONS
J. W. Mellor's "A Comprehensive Treatise on Inorganic and Theoretical Chemistry," Vol. 11, 1931 Ed., pages 746–749, Longmans, Green and Co., New York.
H. Remy, Vol. 2, 1955 Ed., "Treatise on Inorganic Chemistry," page 176, Elsevier Publishing Co., New York.
"Nature," No. 4146, Apr. 16, 1949, pages 601 and 602, (Vol. 163).
Zeitschrift Fur Anorganische und Allgemeine Chemie, Band 316, (1962), pages 168, 169.

Primary Examiner—Edward Stern
Attorney, Agent, or Firm—George L. Church; Donald Johnson; Dr. Paul Lipsitz

[57] ABSTRACT

A process for the manufacture of hydrogen which comprises contacting tungsten dioxide ($WO_2$) with steam at a temperature below about 700°C., preferably between about 400° to 650°C. to produce hydrogen product and $W_4O_{11}$ and regenerating the $WO_2$ from the $W_4O_{11}$ with a reducing gas at a temperature between about 725°C. and about 775°C.

3 Claims, No Drawings

MANUFACTURE OF HYDROGEN

As is well known, hydrogen is an important industrial gas and is becoming of greater importance as a non-polluting source of energy. Accordingly, it is important that new and economical methods be found for the manufacture of this important energy source. An obvious choice as source of hydrogen is water or steam and numerous processes already exist for the conversion of steam to hydrogen. The best known of such processes is the steam-methane process which has enjoyed industrial success. However, the steam-methane process suffers from certain disadvantages, not the least of which is the short supply and relatively high cost of methane. Since hydrogen will be required in very large amounts for upgrading coal and oil shale to liquids and gases it is most desirable that new improved hydrogen processes be developed using minimum cost fuels such as coal, residual oils, and the like.

It is disclosed in U.S. Pat. No. 2,042,285 (Wilke et al, issued May 26, 1936) that methane may be converted to a mixture of carbon monoxide and hydrogen by passing a gaseous substance containing methane at 600° to 1100°C. over a higher oxide of a metal such as titanium, chromium, molybdenum and tungsten and it is further disclosed that the resulting lower oxide, which is obtained in the process, may be converted to a higher oxide with the aid of substances supplying oxygen; e.g., air, steam or carbon dioxide whereby nitrogen, hydrogen or carbon monoxide, respectively, are obtained. However, thermodynamic studies of the free energies for the reduction of the common oxides ($WO_2$ and $WO_3$) with hydrogen and carbon monoxide, and oxidation of these oxides with steam shows that they are not useful in a coupled system for an oxidation-reduction cycle with hydrogen (or carbon monoxide) and steam.

It has now been found that a viable process for manufacturing pure hydrogen is achieved by contacting a particular tungsten dioxide namely $WO_2$, with steam at a temperature below about 700°C., preferably between about 400° and 650°C. to produce hydrogen product and $W_4O_{11}$ and regenerating the starting $WO_2$ from the $W_4O_{11}$ by contacting the $W_4O_{11}$ with a reducing gas at a temperature between 725°C. and about 775°C., preferably about 750°C. whereby the newly found $WO_2$ may be oxidized with steam to give hydrogen and the cycle thus repeated.

As indicated, hydrogen is generated by reacting steam with $WO_2$. However, in starting up the process, the reactor is conveniently charged with $Wo_3$ which is converted to $WO_2$ by passing hydrogen gas over it at a temperature of about 700° to about 750°C. For the process reaction, the tungsten dioxide in the reactor is preferably maintained in a fixed, moving or fluidized bed held at a temperature between 400° and 650°C., preferably about 600°C. and the steam is simply passed through the heated bed of oxide. As the steam passes through the bed, hydrogen is generated and separated from the effluent gases and the $WO_2$ is converted to $W_4O_{11}$. When the tungsten dioxide is completely used up and the remaining tungsten dioxide is essentially all $W_4O_{11}$, a reducing gas is then employed to contact the $W_4O_{11}$ for reduction to $WO_2$ and for this step, the bed should be at a temperature of about between about 725° and 775°C. since the reaction is unfavorable outside this range.

The reducing gas that is passed over the $WO_3$ is preferably obtained from a carbonaceous fuel which is burned in air and steam at about 1100°C. and is preferably producer gas which is an economical source of hydrogen and CO. Such a gas will contain hydrogen and carbon monoxide and on contacting the $W_4O_{11}$ will be converted to water and carbon dioxide respectively, the tungsten oxide product being $WO_2$. The $WO_2$ is then allowed to cool and is again used for reaction with steam at 400° to 650°C. as explained above whereby additional hydrogen is produced.

As indicated, the preferred reducing gas for use in the process is a producer gas which is readily available from various sources in refinery operations and is made by blowing a mixture of air or oxygen and steam through a bed of incandescent carbonaceous fuel and its composition will vary depending upon the source of fuel and equipment used in making the gas (see *Cost Engineering*, July 1963, pages 4–11). Typically, commercial producer gas from coke made with oxygen (not air) contains on a percent by volume basis about 53% CO and about 31% hydrogen.

In order to further illustrate the invention, the following examples are given:

EXAMPLE I 70 grams of tungstic trioxide ($WO_3$) are placed into a ceramic tube which is electrically heated to 750°C. and hydrogen is passed over the tungsten oxide for one hour to reduce it to $WO_2$. The reactor is then cooled to 600°C. and steam is introduced into the tube. The effluent vapor is passed through a condenser and the gaseous hydrogen product is collected by displacement of water. A total of 5.4 liters of hydrogen is thereby collected.

The $W_4O_{11}$ oxide now in the reactor is reduced with hydrogen at 750°C. to obtain $WO_2$. Treatment of the $WO_2$ with steam at 600°C. again gives 5.3 liters of hydrogen.

EXAMPLE II

Carbon monoxide is passed over the same charge of tungsten oxide used in Example I which after the steam treatment was $W_4O_{11}$. After reduction at abut 750°C. for 90 minutes, the reactor is cooled to 600°C. and steam introduced to give a total of 5.3 liters of hydrogen. Another reduction of the oxide with carbon monoxide, followed by steam treatment at 650°C. gives 5.2 liters of hydrogen. After cooling to room temperature the oxide is removed and examined and is found to be a blue material typical of $W_4O_{11}$.

EXAMPLE III

The ceramic reactor is charged with 115 grams Harshaw W–0101 tungsten catalyst (10% $WO_3$ on $Al_2O_3$). This is alternately reduced to $WO_2$ at 750°C. with either $H_2$ and CO and then cooled to 650°C. for oxidation with steam to give the following results:

| Cycle | Reducing Gas | Yield $H_2$ From the Steam Reaction |
|---|---|---|
| I | $H_2$ | 910 cc |
| II | $H_2$ | 820 cc |
| III | CO | 740 cc |
| IV | CO | 760 cc |

As pointed out above, thermodynamic studies show that insofar as tungsten oxides are concerned, only the $WO_2$-$W_4O_{11}$ couple can be used for hydrogen manufacture in accord with the system of the above examples. Furthermore, even for this system to obtain maximum use of the hydrogen and carbon monoxide, the reduction of the $W_4O_{11}$ must be carried out in the relatively narrow temperature range of from about 725° to 775°C., preferably about 750°C. On the other hand, in order for the oxidation of $Wo_2$ by steam to occur favorably, the temperature must be below 700°C., preferably 400° to 650°C., preferably about 600°C.

An attempt to use a $WO_2$ system where $WO_2$ is reduced to metal with hydrogen will require a temperature above 1000°C., but if carbon monoxide is the reducing gas, the reaction is never favorable over the range of 500° to 1200°C. Thus, such a system cannot effectively use readily available producer gas. Likewise, the $WO_3$-$W_4O_{11}$ couple is not a suitable system because the steam reaction with $W_4O_{11}$ is not thermodynamically favored. Thus, the operation of applicant's process is dependent upon the specific $WO_2$-$W_4O_{11}$ system as described above.

The invention claimed is:

1. A process for the manufacture of hydrogen which comprises contacting tungsten dioxide with steam at a temperature below about 700°C. to produce hydrogen and $W_4O_{11}$, regenerating tungsten dioxide from said $W_4O_{11}$ by contacting said $W_4O_{11}$ with a reducing gas at a temperature between about 725°C. and 775°C., and again contacting the tungsten dioxide formed with steam in a new cycle to generate hydrogen.

2. the process of claim 1 where the steam reaction is carried out at about 600°C. and the reduction of $W_4O_{11}$ is carried out at about 750°C.

3. The process of claim 2 where the reducing gas is producer gas.

* * * * *